(12) United States Patent
Adams et al.

(10) Patent No.: US 9,137,942 B2
(45) Date of Patent: Sep. 22, 2015

(54) LOW TORQUE AND VACUUM SEED METER

(71) Applicant: CNH America LLC, New Holland, PA (US)

(72) Inventors: Brian T. Adams, Centralia, MO (US); Keith W. Wendte, Willowbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 74 days.

(21) Appl. No.: 13/732,691

(22) Filed: Jan. 2, 2013

(65) Prior Publication Data
US 2014/0182496 A1     Jul. 3, 2014

(51) Int. Cl.
*A01C 7/04*     (2006.01)
*A01C 7/10*     (2006.01)

(52) U.S. Cl.
CPC .. *A01C 7/046* (2013.01); *A01C 7/10* (2013.01)

(58) Field of Classification Search
CPC ........ A01C 7/046; A01C 7/044; A01C 7/042; A01C 7/04; A01C 7/00; A01C 7/08; A01C 7/081; A01C 7/082; A01C 7/10; A01C 7/12; A01C 7/123; A01C 7/125; A01C 7/16; A01C 7/20; A01C 7/201; A01C 7/206

USPC ......................................... 111/177–185, 170
See application file for complete search history.

(56) References Cited

U.S. PATENT DOCUMENTS

| | | | |
|---|---|---|---|
| 7,334,532 B2 | 2/2008 | Sauder et al. |
| 7,478,603 B2 | 1/2009 | Riewerts et al. |
| 7,854,066 B2 | 12/2010 | Wendte |
| 8,166,896 B2 | 5/2012 | Shoup |
| 2005/0204972 A1 | 9/2005 | Eben et al. |
| 2005/0224510 A1 | 10/2005 | Remis et al. |
| 2009/0090284 A1 | 4/2009 | Peterson, Jr. et al. |
| 2011/0120356 A1 | 5/2011 | Wendte et al. |

*Primary Examiner* — Christopher J Novosad
(74) *Attorney, Agent, or Firm* — Rebecca L. Henkel

(57) ABSTRACT

A seed meter is provided for use with a row crop planter or seed planter that includes a seed disk assembly that rotates within a meter housing cavity and that has a seed disk assembly cavity in which a vacuum pressure is applied for pulling seeds into seed pockets of a seed disk of the seed disc assembly. The vacuum pressure is applied to the seed disk assembly by pulling a vacuum airflow through a spindle that supports the seed disk assembly. A wiper basket is arranged in a fixed position within the seed disk assembly cavity and seals against the seed disk assembly as a support plate and seed disk of the seed disk assembly rotate over the wiper basket, so that side walls of the wiper basket create a boundary between a vacuum zone and a non-vacuum zone inside of the seed disc assembly cavity.

16 Claims, 5 Drawing Sheets ent of the seed meter from the seed meter when compared to typical seed meters

LOW TORQUE AND VACUUM SEED METER

FIELD OF THE INVENTION

The invention relates generally to row-crop planters or seeders and, in particular, to seed disk rotational mounting arrangements and air sealing assemblies for seed meters.

BACKGROUND OF THE INVENTION

Modern farming practices strive to minimize operating expenses. One way of reducing operating expenses is to operate the farm equipment at relatively faster speeds, which reduces the amount of operating time to complete certain tasks. When operating equipment at faster speeds, it can be important to maintain the quality of operation that can be achieved while operating at relatively slower operating speeds. This can be especially difficult to accomplish during planting and seeding operations that require precise seed depth placement and spacing accuracy in order to maintain a good seed environment. Accordingly, seed meter functionality can be very important in modern farming practices to obtain profitability.

Another way of reducing operating expenses is to use relatively more efficient farm equipment that requires less fuel to operate for a given operational time period when compared to less efficient equipment. Some seed meters create a negative pressure between a seed disk and a seed cover component of an outer housing of the seed meter. This tends to pull the seed disk against the seed cover outer housing component which creates a frictional braking force that must be overcome when rotating the seed disks of such typical seed meters. Attempts have been made to reduce those effects by providing seed meters with rotating vacuum chambers. Such seed meters apply a vacuum pressure to the entire inside space of the rotating vacuum chamber and require a complex array of numerous flexible fingers. Each flexible finger periodically bends to mechanically cover an individual opening of the seed disk to cut off vacuum to that opening, and has a wire that inserts into the opening to release the seed from the opening.

SUMMARY OF THE INVENTION

The present invention is directed to a seed meter which provides improved uniformity of seed placement during row crop planting and that is highly efficient so as to require relatively little power to operate when compared to less efficient seed meters. The seed meter may include a seed disk that is supported for low-drag rotation about a spindle by way of bearing assemblies. The seed disk, itself, may be connected to a seed disk hub in which the bearing assemblies are concentrically mounted for rotation about the spindle. The seed disk may be sealed at its outer periphery to the seed disk hub so that a space is provided between the seed disk and a back wall of the seed disk hub. A vacuum may be drawn through the center of the seed disk hub to create negative pressure in the space between the seed disk and seed disk hub back wall, for drawing seeds against the seed disk. In this way, the negative pressure of the seed meter is created within a rotating unitary seed disk assembly that is defined by the seed disk and the seed disc hub, which eliminates the seed disk from being drawn by vacuum against a stationary housing or other component of the seed meter. The fully sealed unit of the seed disk assembly may require relatively less input vacuum pressure to achieve sufficient vacuum pressure at each of multiple seed disk cells into which the seeds are drawn for being dispensed from the seed meter when compared to typical seed meters that have pressure differentials that are established across rotating components that engage fixed components of the seed meter, such as a seed disk and a fixed seed cover. The invention may therefore provide more efficient rotating assemblies that require less torque for rotating the seed disks and require less vacuum pressure to draw seeds against the seed disks so that the seed meters can be operated while using less power.

According to one aspect of the invention, a seed meter is provided that includes a housing assembly that includes a housing cavity therein and a seed disk assembly that is arranged for rotation inside of the housing cavity. The seed disk assembly includes a support plate that has a back wall and a seed disk that is mounted to the support plate so that the support plate back wall and seed disk are spaced from each other. A seed disk assembly cavity is defined in the space between the support plate back wall and seed disk. A wiper basket may be arranged within the seed disk assembly cavity and that engages an inwardly facing surface of the seed disk. This may create a seal that separates the seed disk assembly cavity into a vacuum zone in which a vacuum pressure is present in the seed disk assembly cavity for holding seeds against the seed disk and a non-vacuum zone in which the seeds are not held against the seed disk by vacuum pressure so that the seeds can freely fall away from the seed disk This may provide an arrangement in which there is no frictional braking between the seed disk and the outer fixed housing components of the seed meter, which may allow for rotating various components of a seed meter while requiring less torque to rotate the components.

According to another aspect of the invention, the wiper basket may include a basket cavity that may be defined between the interconnected side walls and a back wall of the wiper basket. The basket cavity may be vented to atmosphere which may be done with a vent tube that connects the basket cavity to an interior of the seed meter or outside the seed meter so as to provide the basket cavity with ambient or greater pressure at the non-vacuum zone.

According to another aspect of the invention, a blocking plate may be arranged adjacent the wiper basket. The blocking plate may include an outwardly facing surface that engages the inwardly facing surface of the seed disk so as to cover the holes through the seed disk at the non-vacuum zone. The blocking plate may be arranged downstream of the wiper basket. In this way, the blocking plate may block vacuum leakage through holes of the seed disk that are not covered by seeds in the seed pockets, after the seeds have fallen out of the seed pockets when aligned with the wiper basket that is vented to atmosphere through the wiper basket cavity.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
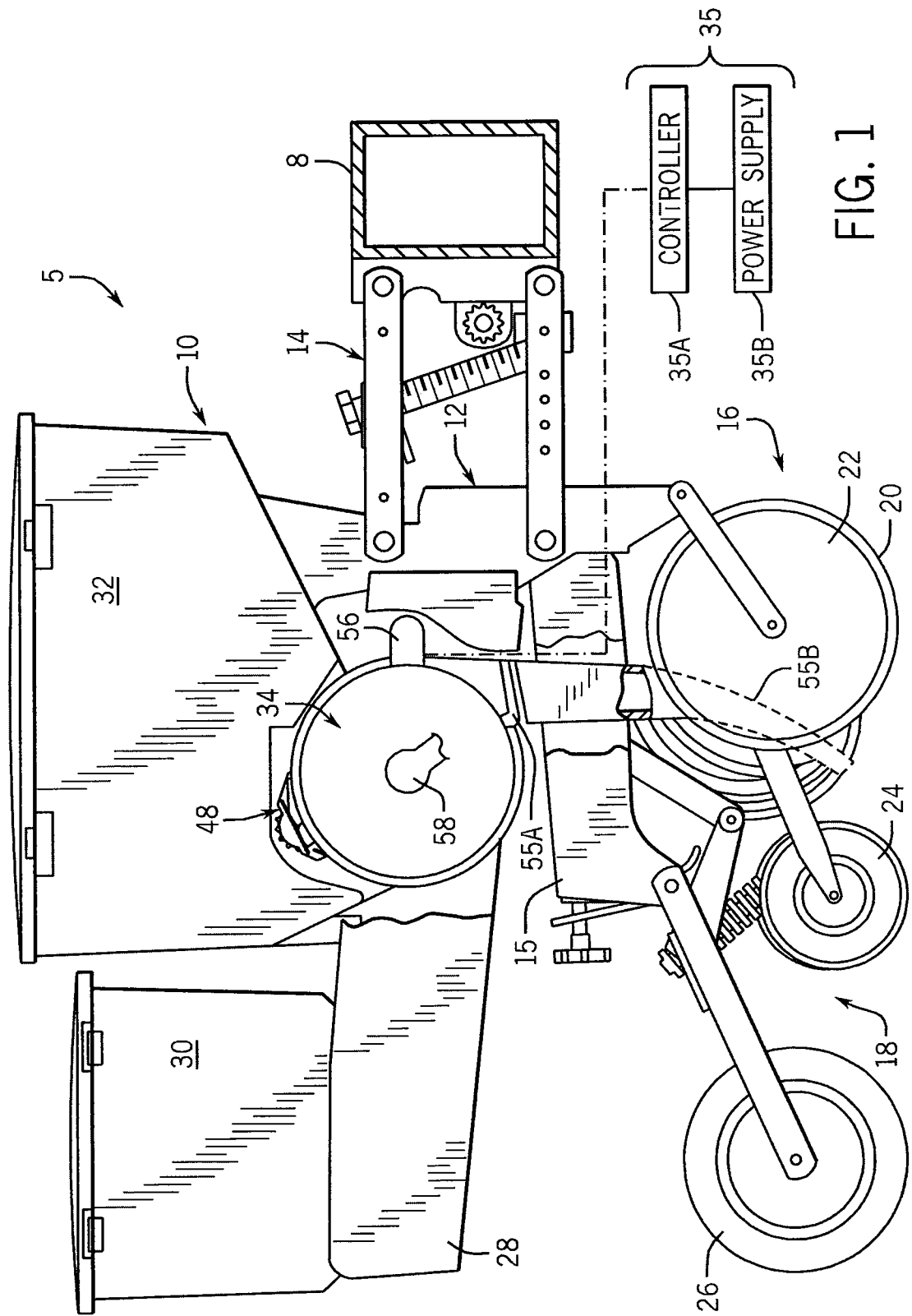
FIG. 1 illustrates a side elevational view of a portion of a seed planter incorporating a seed meter in accordance with the present invention.

Referring now to the drawings and specifically to FIG. 1, a portion of a multiple row crop planter implement or seed planter 5 is shown. The seed planter 5 is typically pulled by a tractor or other traction device (not shown). Seed planter 5 includes a main frame 8 that holds multiple individual row planting units 10, each row planting unit 10 being substantially identical. Only a single row planting unit 10 is shown for simplicity sake.

Still referring to FIG. 1, row planting unit 10 includes a sub-frame 12 that is connected to the main frame 8 by way of a parallel linkage system 14. The sub-frame 12 includes a backbone 15 that supports a furrow opening mechanism 16 and a furrow closing mechanism 18 that is arranged behind the furrow opening mechanism 16. The furrow opening mechanism 16 includes an opener disk(s) 20 that penetrates the soil and creates a furrow and gauge wheel 22 that has a limited displacement relative to the opener disk(s) 20. This allows the depth of the furrow to be selected by an operator by adjusting the amount of permitted movement of the gauge wheel 22 so as to control the depth to which the opener disk(s) 20 can penetrate the soil. The furrow closing mechanism 18 includes a closing disk(s) 24 that closes the furrow after the row planting unit 10 deposits seeds into the furrow and a press wheel 26 that rolls over the closed furrow to firm the soil over the seed to further close the furrow and promote favorable seed to soil contact.

Still referring to FIG. 1, the sub-frame includes a shelf 28 that is arranged above and generally parallel to the backbone 15. Shelf 28 is shown supporting an optional pesticide hopper 30 that contains, e.g., an herbicide or an insecticide, along with a known pesticide dispensing system (not shown) for applying controlled amounts of the contents in the desired location(s) while using the seed planter 5. Shelf 28 also supports a seed hopper 32 that holds the seed supply for planting by the row planting unit 10. The particular seed hopper 32 shown in FIG. 1 is configured to store the seed material row planting unit 10. In another embodiment, the seed is held in bulk storage in a primary seed hopper at a remote location, spaced from the various row planting units 10, whereby the seeds are supplied to the row planting units 10 pneumatically, or otherwise, through a seed conduit. Regardless of the particular configuration of seed hopper 32, the seeds are directed from the seed hopper 32 to a seed meter 34. A known vacuum source (not shown) is operably connected to a seed meter 34 for drawing a vacuum airflow to create a vacuum pressure inside of the seed meter 34, as described in greater detail elsewhere herein. Seed meter 34 is operably connected to a control system 35 that includes a controller 35A and power supply 35B, as is known, for controlling the seed meter 34. The controller 35A can include an industrial computer or, e.g., a programmable logic controller (PLC), along with corresponding software and suitable memory for storing such software and hardware including interconnecting conductors for power and signal transmission for controlling electronic or electro-mechanical components of the system seed meter 34.

Figure 2:
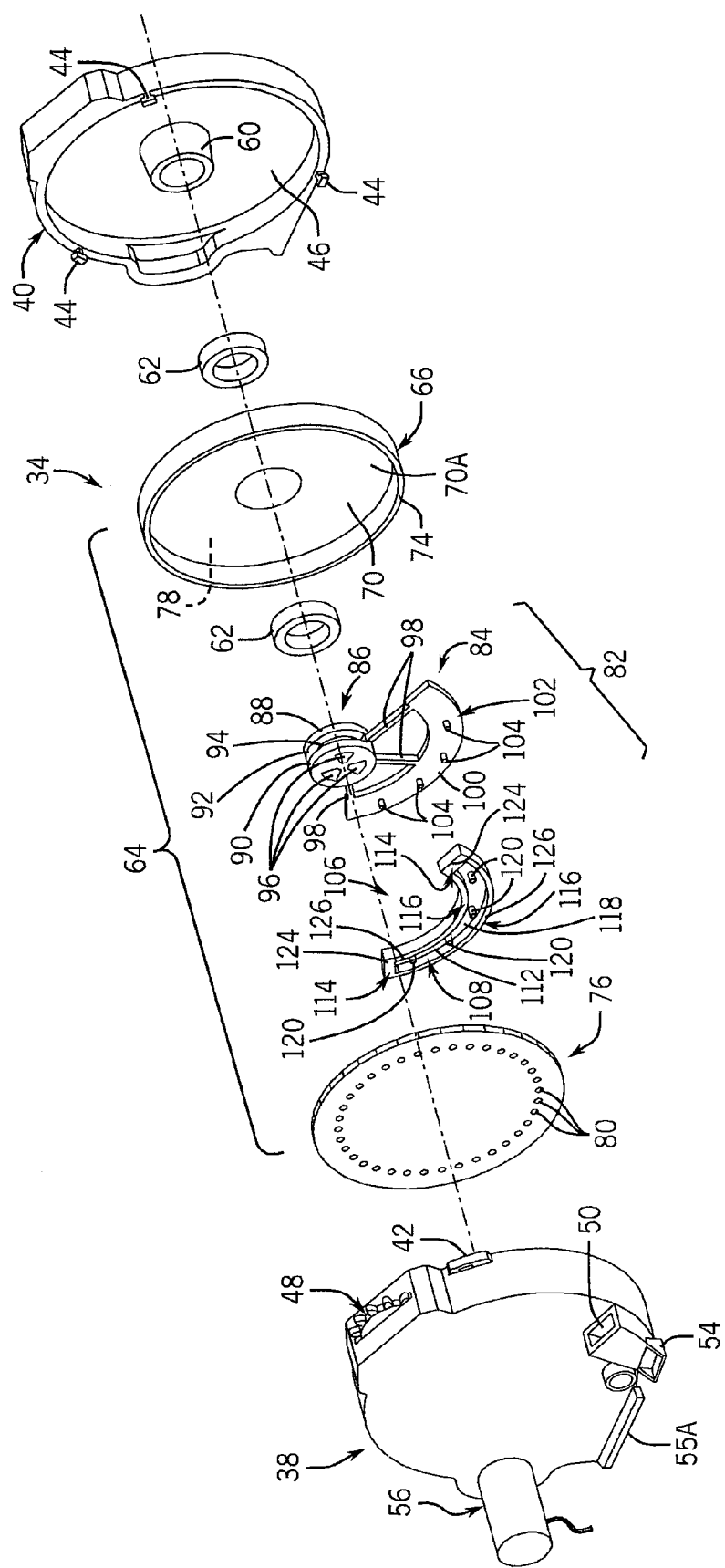
FIG. 2 illustrates an exploded pictorial view of the seed meter shown in FIG. 1 taken from above and behind the meter cover.
Figure 3:
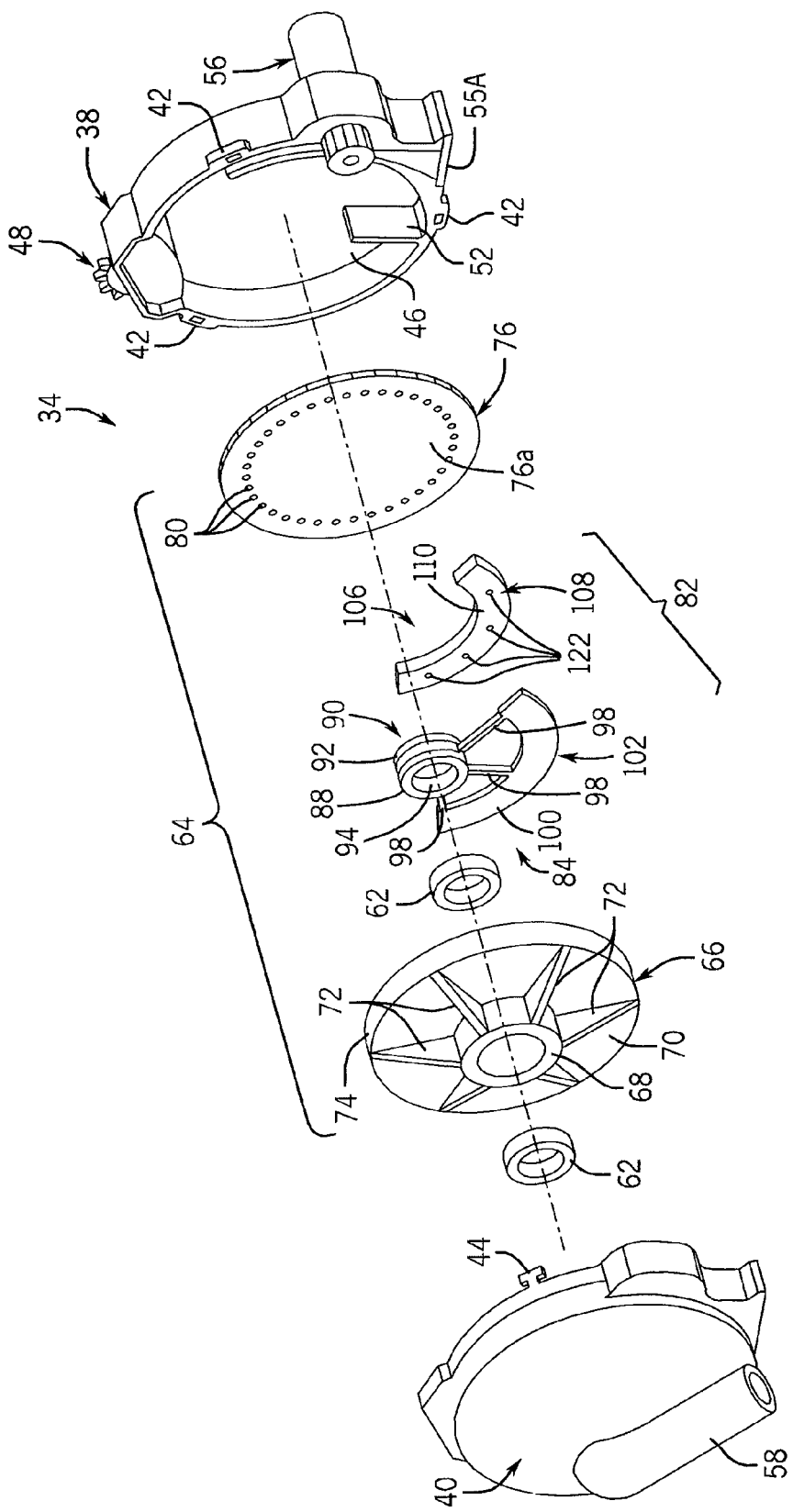
FIG. 3 illustrates an exploded pictorial view of the seed meter shown in FIG. 1 taken from above and behind the seed disk assembly cover.

Referring now to FIGS. 2 and 3, the seed meter 34 includes a multi-component meter housing that supports the entire seed meter 34 and its components and temporarily holds the seed that is being metered. The multi-component meter housing includes a meter cover 38 and a seed disk assembly cover 40 that engage each other at respective outer peripheries. The meter cover 38 and seed disk assembly cover 40 include slots 42 and tabs 44 that engage each other upon rotation of the meter and seed covers 38, 40 so as to secure the meter and seed disk assembly covers 38, 40 together in a cam-locking-type manner. In another embodiment, latches (not shown) are provided on the meter and seed disk assembly covers 38, 40 for securing the meter and seed disk assembly covers 38, 40 together. When the meter and seed disk assembly covers 38, 40 are secured together, the meter housing 38 defines an enclosure with a meter housing cavity 46 therein.

Referring to FIGS. 2 and 3, a seed singulator 48 that is configured to inhibit more than one seed from being discharged from the seed meter 34 per seed discharge event is arranged on the meter housing 38. A seed opening 50 (FIG. 2) extends into the meter cover 38 and provides an entry through which the seed enters the seed meter 34 and is held in an area of the meter housing cavity 46 that is confined by a divider wall 52 (FIG. 3) and seed disc 76. A hinged cover door 54 (FIG. 2) covers a seed clean-out exit hole (not shown) that can be pivoted open and serves as a funnel to clean out the seed meter 34 when it is not being used. A seed outlet 55A directs the seed being delivered out of the seed meter 34 and to a seed tube 55B (FIGS. 1 and 4) for depositing the seed into a seed bed. A drive assembly 56 is mounted to the meter cover 38 for driving the rotating components of the seed meter 34. Drive assembly 56 includes an electric motor and drive gear(s) and is operably connected to the control system 35 (FIG. 1). A suitable drive assembly 56 is disclosed in commonly owned U.S. Pat. No. 7,617,785, entitled Direct Electric Drive Seed Meter, which is incorporated herein by reference in its entirety. It is understood that the drive assembly 56 may have other configurations to mechanically drive the seed meter 34, such as drive shafts, chains and belts, peg and hole drive systems, and others.

Still referring to FIGS. 2 and 3, vacuum inlet 58 (FIG. 3) is connected by way of a vacuum supply hose (not shown) to the vacuum source. The vacuum inlet 58 (FIG. 3) connects to a spindle 60 (FIG. 2) that extends from an inwardly facing surface of the seed disk assembly cover 40, axially into the meter housing cavity 46. A pair of bearings 62 is arranged on the outer circumferential surface of the spindle 60 and supports a seed disk assembly 64 for rotation upon the spindle 60. The disk assembly 64 can rotate upon and is sealed with respect to the spindle 60, so that the vacuum source creates a vacuum pressure within the seed disk assembly 64, while the meter housing cavity 46 remains substantially at an ambient pressure.

Referring to FIG. 3, the seed disk assembly 64 includes a support plate 66 that has a hub 68 in which the bearings 62 are mounted, and a back wall 70 that is attached to an end of the hub 68. Multiple support webs 72 extend between and connect an outer circumferential surface of the hub 68 to a rearward facing surface of the back wall 70. Referring to FIG. 2, a collar 74 extends in an axial direction from an outer perimeter of the support plate back wall 70. A seed disk 76 is mounted to the support plate collar 74 so that a seed disk assembly cavity 78 (FIG. 2) is defined between an inwardly facing surface 70A of the back wall 70 of the support plate 66 and an inwardly facing surface 76A (FIG. 3) of the seed disk 76.

Referring again to FIGS. 2 and 3, the seed disk 76 can be mounted to the support plate collar 74 by way of screws or other fasteners. This may allow the seed disk 76 to be removed from the support plate collar 74 for installation of another seed disk 76 so as to accommodate different seed disks 76 for planting different types of seed. The seed disk 76 has a geared outer circumferential surface, with radially extending gear teeth that intermesh with the drive gear(s) of the drive assembly 56, which allows the seed disk assembly 64 to be rotated by the drive assembly 56. In another embodiment, the drive assembly 56 rotates the seed disk assembly 64 by engaging and driving a geared surface provided on the support plate collar 74 or provided on the hub 68. As is known, seed disk 76 includes seed pockets 80 that are discrete openings that include holes that extend between front and back surfaces and thus through the entire thickness of the seed disk 76. The seed pockets 80 are spaced from each other and, in this embodiment, are arranged in a single circle-shaped pattern. In other embodiments of the seed disk 76 that are configured for planting relatively small seeds like soybeans and sorghum, relatively more seed pockets 80 are provided and are arranged in patterns of multiple concentric circles so that the seed pockets 80 occupy a relatively larger percentage of the surface area of the seed disk 76.

Referring still to FIGS. 2 and 3, a wiper basket assembly 82 is arranged within the seed disk assembly cavity 78. The wiper basket assembly 82 remains in a fixed position within the seed meter 34 while the support plate 66 and the seed disk 76 rotate about the wiper basket assembly 82. Wiper basket assembly 82 includes a bracket 84 with an upper end 86 that is supported by the spindle 60. The upper end 86 includes a pair of side plates 88, 90 that are spaced from each other within opening 92 defined between the side plates 88, 90. Side plate 88 includes a hole 94 (FIG. 3) that fits over and seals against the spindle 60. The side plate 90 can be spaced from the spindle 60 so that a vacuum airflow path can flow through the opening 92 between the plates 88, 90 and into the opening of and through the spindle 60, toward the vacuum source. In another embodiment, the spindle 60 abuts the side plate 90 and the vacuum airflow can be directed through openings 96 that extend through the side plate 90 so as to allow the airflow to flow into and through the spindle 60.

Still referring to FIGS. 2 and 3, arms 98 extend from the bracket upper end 86 toward a plate 100 that is arranged at a lower end 102 of the bracket 84. The plate 100 is generally C-shaped in profile and has a perimeter with an outer edge that is curved and that is parallel to and spaced from the rim 74 of the support plate 66. As shown in FIG. 2, springs 104 are arranged between the plate 100 and a wiper basket 106 so that the springs 104 bias the wiper basket 106 to press against and engage an inwardly facing surface of the seed disk 76.

Still referring to FIGS. 2 and 3, the wiper basket 106 is generally C-shaped in profile, correspondent shaped at the bracket plate 100. The wiper basket 106 includes a back wall 108 that has an inwardly facing surface 110 and outwardly facing surface 112. The inwardly facing surface 110 of the wiper basket back wall 108 faces toward the bracket 84 and the outwardly facing surface 112 faces toward the seed disk 76. Interconnected side walls, which are shown as a pair of short side walls 114 at ends of the wiper basket 106 and a pair of long side walls 116 at upper and lower portions of the wiper basket 106, extend perpendicularly from an outer perimeter of the wiper basket back wall 108. The long side walls 116 are curved and parallel to and spaced from each other and parallel to and spaced from the support plate collar 74 of the seed disk assembly 64. A cavity 118 is defined within the wiper basket 106 and has a boundary defined by the back wall 108 and the side walls 114, 116. The wiper basket 106 has an opening that extends into the cavity 118 so that the cavity 118 is presented facing the inwardly facing surface of the seed disk 76. Spring pockets 120 are arranged within the cavity 118 for holding the springs 104. The spring pockets 120 extend from the back wall 108 as cylindrical projections into the cavity 118 with bores 122 (FIG. 3) that receives the springs 104. In this way, the springs 104 push the wiper basket 106 from various spaced apart locations toward the seed disk 76 so that edges 124, 126 of the side walls 114, 116, respectively, engage the seed disk so as to create a seal between the seed disk 76 and the wiper basket 106. In one embodiment, each of the edges 124, 126 includes a seal that is made from a polymeric and/or an elastomeric material. In one embodiment, the springs 104 are not used for pushing the wiper basket 106 against the seed disk 76, but instead this is done by way of the bracket 84 itself. In such embodiment, at least one of the bracket arms 98 is arranged to bias the wiper basket 106 toward the seed disk 76 so that the wiper basket 106 is pushed against the inwardly facing surface 76A (FIG. 3). This may be done by arranging the bracket arm(s) 98 to position the wiper basket 106 with a slight interference between the wiper basket 106 and the inwardly facing surface 76A. In this way, the wiper basket 106 always engages the inwardly facing surface 76A so as to deflect the bracket arm(s) 98 away from the 106 inwardly facing surface 76A, whereby the deflected bracket arm(s) 98 provides a restorative biasing force toward the inwardly facing surface 76A of the seed disk 76.

Figure 4:
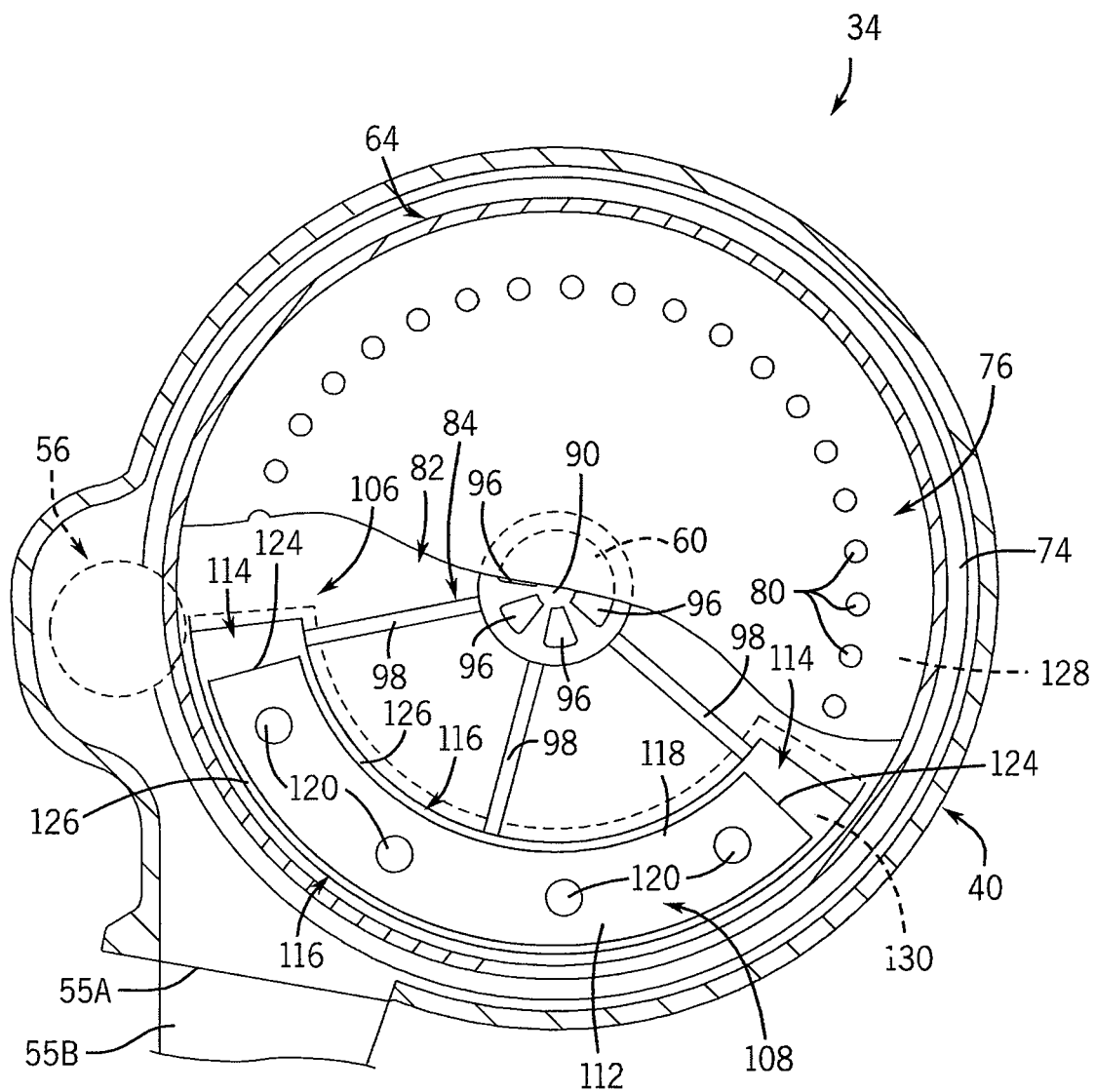
FIG. 4 illustrates a partial cross-sectional view of the seed meter of FIG. 1 facing the meter cover.

Referring now to FIG. 4, with the wiper basket 106 continuously engaging the inwardly facing surface of the seed disk 76, the wiper basket 106 seals and separates a portion of the seed disk assembly cavity 78 away from the remainder of the seed disk assembly cavity 78. In this way, the wiper basket 106 defines a boundary within the seed disk assembly 64 (FIGS. 2 and 3) between a vacuum zone 128 and a non-vacuum zone 130. The vacuum zone 128 is defined within the seed disk assembly cavity 78 but outside of the wiper basket 106. In this way, the vacuum zone 128 is fluidly connected to the vacuum source through the opening 92 between the side plates 88, 90 of the bracket 84 and/or the openings 96 of the side plate 90 and the spindle 60. The vacuum source evacuates air from within the vacuum zone 128 which creates a vacuum airflow toward the vacuum source so as to create a vacuum and thus negative pressure within the vacuum zone 128. The non-vacuum zone 130 is sealed away and mechanically separated from such vacuum pressure by the engagement of the edges 124, 126 or other portions of the side walls 114, 116, and the seed disk 76 rotates past and wipes over the wiper basket 106. The non-vacuum zone 130 may define a cutoff chamber at which the seeds may freely fall away from the seed pockets 80 of the seed disk 76 to a vacuum holding force at the non-vacuum zone 130.

Figure 5:
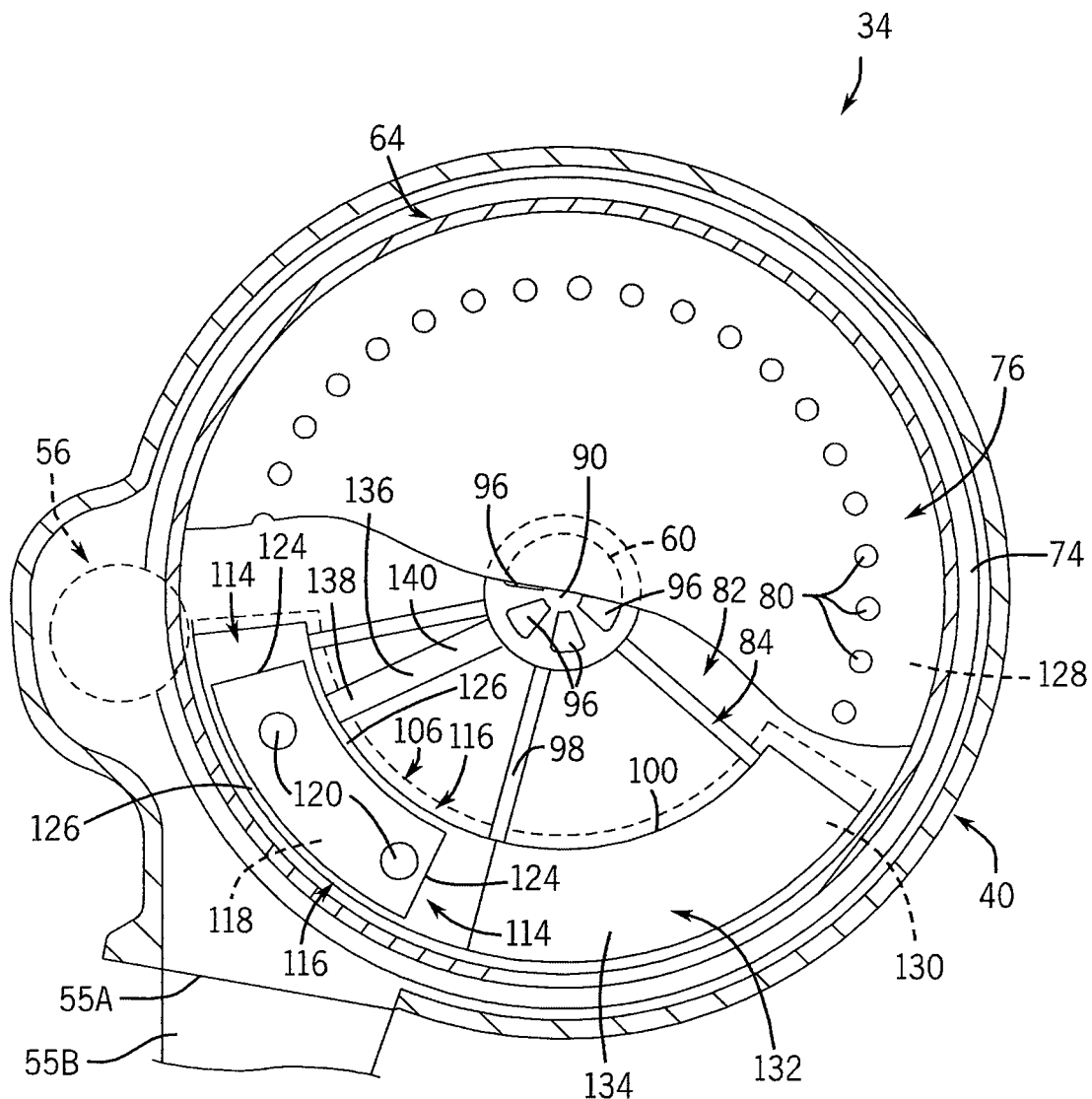
FIG. 5 illustrates a partial cross-sectional view, facing the seed disk, of a variant of the wiper basket assembly of FIG. 4.

Referring now to FIG. 5, the wiper basket assembly 82 is mostly identical to those described with respect to FIGS. 2-4, whereby such descriptions are applicable here with respect to the wiper basket assembly 82 of FIG. 5. The wiper basket assembly 82 of FIG. 5 also includes a blocking plate 132 that is arranged within the non-vacuum zone 130. The blocking plate 132 is arranged adjacent the wiper basket 106, shown as being downstream of the wiper basket 106, and is supported on the plate 100 of the bracket 84. The blocking plate 132 has an outwardly facing surface 134 that is substantially flat and is in face-to-face engagement with the inwardly facing surface of the seed disk 76 and which may be made from a polymeric and/or elastomeric material that can seal against the seed disk 76. In this way, the blocking plate 132 may block vacuum leakage through holes of the seed disk that are not covered by seeds in the seed pockets 80, after the seeds have fallen out of the seed pockets 80 when aligned with the wiper basket 106 that is vented to atmosphere through the wiper basket cavity 118. In this embodiment, a vent tube 136 extends from the wiper basket 106 to a location at an ambient pressure, so as to vent the basket cavity 118 to ambient pressure for providing ambient pressure within the basket cavity 118. The vent tube 136 has a longitudinally extending bore, a first end 138 that is fluidly connected to the basket cavity 118, and a second end 140 that is fluidly connected to a location at ambient pressure, for example, the meter housing cavity 46 or a location outside the seed meter 34 to provide such venting.

In light of the above, during use of the seed meter 34, seed is delivered from the seed hopper 32 (FIG. 1) through the seed opening 50 (FIG. 2), and is temporarily held in the meter housing cavity 46 (FIG. 2) in an area that is confined by the divider wall 52 and seed disc 76 (FIG. 3). The drive assembly 56 rotates the seed disk assembly 64 at a rotational speed that corresponds to the ground speed of the particular row planting unit 10. The vacuum source pulls a vacuum airflow from the vacuum zone 128 (FIGS. 4 and 5) of the seed disk assembly cavity 78, which is directed through the opening(s) 92, 96 (FIGS. 2 and 3) of the bracket 84, through the seed assembly cover spindle 60 (FIG. 2), and through the vacuum inlet 58 and vacuum supply hose, to the vacuum source. Seed pockets 80 that rotate into the vacuum zone 128 are subjected to the negative pressure, whereby air is drawn through the seed pockets 80 which pull and hold seeds from the meter housing cavity 46 into the seed pockets 80. The vacuum pressure holds the seeds in the seed pockets 80 while the seed disk 76 and support plate 66 rotate until the seed pockets 80 rotate into the non-vacuum zone 130, at which point the pockets 80 are no longer subjected to the vacuum pressure inside of the seed disk assembly 64. Ambient air or air at greater than ambient pressure of the seed disk assembly cavity 78 flows into the non-vacuum zone 130 through the holes of the empty pockets 80 and may also leak past the seeds within the pockets 80 into the wiper basket cavity 118 and/or through the vent tube 136. This removes the vacuum pressure at the non-vacuum zone 130 that holds the seeds in the pockets 80, and the seeds fall from the pockets 80 by gravity through the seed outlet 55A and seed tube 55B (FIGS. 1 and 4) and into the seed bed.

Many changes and modifications could be made to the invention without departing from the spirit thereof. The scope of these changes will become apparent from the appended claims.

We claim:

1. A seed meter, comprising:
   a housing assembly defining a housing cavity; and
   a seed disk assembly that is arranged for rotation inside of the housing cavity, the seed disk assembly including,
      a rotatable support plate having a back wall including an inwardly facing surface;
      a rotatable seed disk that has an inwardly facing surface and that is mounted to the support plate so as to define a seed disk assembly cavity between the inwardly facing surfaces of the support plate back wall and the seed disk; and
      a wiper basket arranged within the seed disk assembly cavity and engaging the inwardly facing surface of the seed disk so as to create a seal that separates the seed disk assembly cavity into a vacuum zone in which a vacuum pressure is present in the seed disk assembly cavity for holding seeds against the seed disk and a non-vacuum zone in which the seeds are isolated from the vacuum pressure;
   wherein the wiper basket is maintained in a fixed position within the seed disk assembly cavity as the support plate and the seed disk rotate.

2. The seed meter of claim 1 wherein the housing assembly includes a spindle that is hollow and connected to a vacuum source and that extends inwardly into the housing cavity to a location within the housing cavity that is spaced from the wiper basket.

3. The seed meter of claim 2 wherein the seed disk assembly is mounted for rotation with respect to, and operably connected to, the spindle so that a vacuum airflow that is created by the vacuum source is drawn from the vacuum zone of the seed disk assembly and through the spindle of the housing assembly and wherein the wiper basket is arranged within the housing cavity so as to block the vacuum airflow at the non-vacuum zone.

4. The seed meter of claim 3 wherein the wiper basket is fixed with respect to the spindle so that the seed disk assembly slides across the outwardly facing edges of the wiper basket when the seed disk assembly rotates.

5. The seed meter of claim 4 wherein each of the outwardly facing edges of the wiper basket includes a seal that engages the inwardly facing surface of the seed disk.

6. The seed meter of claim 1 wherein the seed disk assembly support plate includes a collar that extends in an axial direction from an outer perimeter of the support plate back wall and the seed disk is mounted to the collar such that a boundary of the seed disk assembly cavity is defined between the seed disk, the support plate back wall, and the support plate collar, and wherein the wiper basket is nested within and spaced radially from the collar.

7. The seed meter of claim 6 wherein the wiper basket includes a curved side wall that is generally parallel to and spaced radially from the support plate collar.

8. The seed meter of claim 6 wherein the wiper basket includes multiple interconnected side walls that extend generally perpendicular with respect to the seed disk and wherein the outwardly facing edges of the wiper basket are defined at the side walls.

9. The seed meter of claim 1 further comprising a bracket that is arranged and fixed within the seed disk assembly cavity and that supports the wiper basket and at least one spring that is arranged between the bracket and the wiper basket so as to bias the wiper basket against the inwardly facing surface of the seed disk.

10. The seed meter of claim 9 wherein the wiper basket includes a back wall that is arranged generally parallel to and spaced from the seed disk and multiple interconnected side walls that extend from the wiper basket back wall toward the seed disk and a basket cavity is defined between the interconnected side walls and back wall of the wiper basket.

11. The seed meter of claim 1 further comprising a bracket that is fixed within the seed disk assembly cavity and that supports the wiper basket, the bracket including at least one arm that is arranged to push the wiper basket against the inwardly facing surface of the seed disk.

12. A seed meter, comprising:
   a housing assembly defining a housing cavity therein and including a spindle that is hollow and connected to a vacuum source, the spindle extending into the housing cavity; and
   a seed disk assembly arranged for rotation inside of the housing cavity, the seed disk assembly including, a rotatable support plate having a back wall including an inwardly facing surface and a collar that extends from a perimeter of the inwardly facing surface of the back wall;

a rotatable seed disk having an inwardly facing surface and being mounted to the support plate collar such that a seed disk assembly cavity is defined between the inwardly facing surfaces of the seed disk and the support plate back wall, the seed disk having multiple seed pockets that are spaced from each other and that include holes extending from the seed pockets through the seed disk to allow for vacuum airflows to be drawn through the holes so as to hold seeds in the seed pockets by vacuum;

a bracket arranged in the seed disk assembly cavity in a fixed position with respect to the spindle and has an opening in fluid communication with the spindle for conveying a vacuum airflow from the seed disk assembly cavity into the housing assembly spindle; and a wiper basket engaging the inwardly facing surface of the seed disk and arranged to cover multiple holes of the seed disk simultaneously so as to create a seal separating the seed disk assembly cavity into a vacuum zone in which a vacuum pressure is present in a first set of multiple seed pockets for holding seeds against the seed disk at the first set of multiple seed pockets and a non-vacuum zone defined by a second set of multiple seed pockets exposed to at least one of an ambient pressure and a greater than ambient pressure such that the seeds are isolated from the vacuum pressure;

wherein the wiper basket is maintained in a fixed position within the seed disk assembly cavity as the support plate and the seed disk rotate.

13. The seed meter of claim 12 wherein the wiper basket includes multiple interconnected side walls that extend generally perpendicular with respect to the seed disk and that define a basket cavity therebetween and wherein the basket cavity overlies the holes of the non-vacuum zone.

14. The seed meter of claim 13 wherein the wiper basket side walls include outwardly facing edges that engage the inwardly facing surface of the seed disk.

15. The seed meter of claim 14 wherein each of the outwardly facing edges of the wiper basket includes a seal that engages the inwardly facing surface of the seed disk.

16. A seed meter, comprising:
a housing assembly defining a housing cavity therein, the housing cavity being substantially maintained at ambient pressure and including a hollow spindle and being connected to a vacuum source, wherein the spindle extends into the housing cavity; and a seed disk assembly arranged for rotation inside of the housing cavity, the seed disk assembly including,
a rotatable support plate having a back wall and a collar extending from a perimeter of the back wall;
a rotatable seed disk mounted to the support plate collar such that the support plate and the seed disk of the seed disk assembly rotate in unison with each other, the seed disk and the support plate back wall defining a seed disk assembly cavity therebetween, the seed disk having seed pockets that include holes extending through the seed disk in an axial direction;
a bracket arranged in the seed disk assembly cavity in a fixed position with respect to the spindle, the bracket having an opening that is in fluid communication with the spindle for conveying a vacuum airflow from the seed disk assembly cavity into the housing assembly spindle and a wiper seal support wall extending generally transversely between the seed disk and the support plate back wall; and
a wiper basket maintained in a fixed position within the seed disk assembly cavity as the support plate and the seed disk rotate and including a back wall arranged generally parallel to and spaced from the seed disk and multiple interconnected wiper basket side walls that extend from the wiper basket back wall toward the seed disk, the interconnected side walls and back wall of the wiper basket defining a basket cavity therebetween, wherein the wiper basket side walls have outer edges that define a periphery about an opening that extends into the basket cavity and the wiper basket side wall outer edges engaging the seed disk so as to create a seal that separates the seed disk assembly cavity into a vacuum zone that is arranged outwardly of the wiper basket side wall outer edges so as to provide vacuum pressure to seed pockets that are arranged outwardly of the wiper basket for holding seed in the seed pockets and a non-vacuum zone that is arranged inwardly of the wiper basket side wall outer edges so that air from the housing cavity can flow through the seed pockets that are aligned with the non-vacuum zone so that a pressure within the non-vacuum zone is greater than a pressure within the vacuum zone, whereby seeds cannot be held by vacuum at seed pockets that are aligned with the wiper basket.

* * * * *